United States Patent
Fan et al.

(10) Patent No.: US 12,052,570 B2
(45) Date of Patent: Jul. 30, 2024

(54) METHODS AND DEVICES OF DETECTION OF MISBEHAVING UEs USING DATA ANALYSIS

(71) Applicant: NEC Corporation, Tokyo (JP)

(72) Inventors: Linghang Fan, Woking (GB); Toshiyuki Tamura, Tokyo (JP); Iskren Ianev, Lower Earley (GB)

(73) Assignee: NEC CORPORATION, Tokyo (JP)

(*) Notice: Subject to any disclaimer, the term of this patent is extended or adjusted under 35 U.S.C. 154(b) by 381 days.

(21) Appl. No.: 17/626,964

(22) PCT Filed: Dec. 15, 2020

(86) PCT No.: PCT/JP2020/046741
§ 371 (c)(1),
(2) Date: Jan. 13, 2022

(87) PCT Pub. No.: WO2021/131902
PCT Pub. Date: Jul. 1, 2021

(65) Prior Publication Data
US 2022/0369110 A1 Nov. 17, 2022

(30) Foreign Application Priority Data
Dec. 23, 2019 (EP) .................... 19219407

(51) Int. Cl.
*H04W 12/12* (2021.01)
*H04W 12/71* (2021.01)
*H04W 24/08* (2009.01)

(52) U.S. Cl.
CPC .......... *H04W 12/12* (2013.01); *H04W 12/71* (2021.01); *H04W 24/08* (2013.01)

(58) Field of Classification Search
CPC ...... H04W 12/12; H04W 12/71; H04W 24/08
See application file for complete search history.

(56) References Cited

U.S. PATENT DOCUMENTS

| | | | |
|---|---|---|---|
| 11,751,046 B1 * | 9/2023 | Mariyani | H04W 8/24 |
| | | | 455/3.01 |
| 11,924,632 B2 * | 3/2024 | Watfa | H04W 12/06 |
| 2016/0212691 A1 * | 7/2016 | Roeland | H04W 60/00 |
| 2017/0094501 A1 * | 3/2017 | Huang-Fu | H04W 8/183 |
| 2017/0094707 A1 * | 3/2017 | Lin | H04W 28/0289 |
| 2018/0279195 A1 * | 9/2018 | Kim | H04W 36/22 |
| 2018/0343659 A1 * | 11/2018 | Hahn | H04W 72/0446 |
| 2021/0058789 A1 | 2/2021 | Hu et al. | |

(Continued)

FOREIGN PATENT DOCUMENTS

| | | | | | |
|---|---|---|---|---|---|
| GB | 2612623 A | * | 5/2023 | ............ | H04W 24/02 |
| WO | 2019/192366 A1 | | 10/2019 | | |

(Continued)

OTHER PUBLICATIONS

JP Office Action for JP Application No. 2023-024415, mailed on Dec. 12, 2023 with English Translation.

(Continued)

*Primary Examiner* — Adam D Houston
(74) *Attorney, Agent, or Firm* — Sughrue Mion, PLLC

(57) ABSTRACT

New methods are proposed to detect misbehaving UEs based on 5GS. The methods allow the network to react accurately and efficiently to deal with misbehaving UE(s).

20 Claims, 12 Drawing Sheets

(56) References Cited

U.S. PATENT DOCUMENTS

| | | | |
|---|---|---|---|
| 2021/0092609 A1 | 3/2021 | Wang | |
| 2021/0368339 A1* | 11/2021 | Watfa | H04W 12/06 |
| 2022/0232363 A1* | 7/2022 | Watfa | H04W 4/12 |
| 2023/0051733 A1* | 2/2023 | Shah | H04W 72/56 |
| 2023/0156579 A1* | 5/2023 | Thiebaut | H04W 48/16 |
| | | | 370/329 |
| 2023/0370962 A1* | 11/2023 | Hua | H04W 76/10 |

FOREIGN PATENT DOCUMENTS

| | | |
|---|---|---|
| WO | 2019/237926 A1 | 12/2019 |
| WO | WO-2023278401 A1 * | 1/2023 |
| WO | WO-2023041416 A1 * | 3/2023 |

OTHER PUBLICATIONS

ZTE, Clarification of User Data Congestion Analytics [online], 3GPP TSG SA WG2 #136 S2-1911135, Internet<URL: https://www.3gpp.org/ftp/tsg_sa/WG2_Arch/TSGS2_136_Reno/Docs/S2-1911135.zip>, Nov. 8, 2019.

International Search Report for PCT Application No. PCT/JP2020/046741, mailed on Mar. 17, 2021.

English translation of Written opinion for PCT Application No. PCT/JP2020/046741, mailed on Mar. 17, 2021.

3GPP TS 23.501 V16.2.0, "System Architecture for the 5G System (5GS)", Sep. 2019, pp. 1-389.

3GPP TS 23.502 V16.2.0, "Procedures for the 5G System (5GS)", Sep. 2019, pp. 1-524.

3GPP TS 23.288 V16.1.0. "Architecture enhancements for 5G System (5GS) to support network data analytics services", Sep. 2019, pp. 1-52.

3GPP TR 23.700-91 V0.2.0, "Study on Enablers for Network Automation for 5G -phase 2", Dec. 2019, pp. 1-19.

3GPP TS 23.015 V15.1.0, "Technical realization of Operator Determined Barring (ODB)", Dec. 2016, pp. 1-35.

3GPP TS 24.501 V16.2.0. "Non-Access-Stratum (NAS) protocol for 5G System (5GS); Stage 3", Sep. 2019, pp. 1-610.

3GPP TR 33.861 V1.5.0, "Study on evolution of Cellular IoT security for the 5G System", Nov. 2019, pp. 1-72.

3GPP TS 23.288 V16.2.0, "Architecture enhancements for 5G System (5GS) to support network data analytics services", Dec. 2019, pp. 1-57.

S2-1900504, China Mobile et al., "TS 23.288 Performance Improvement and Supervision of general mode for mIoI Terminals", 3GPP TSG-SA WG2 Meeting #130, Jan. 21-25, 2019, Kochi, India.

JP Office Action for JP Application No. 2022-503952, mailed on Jan. 24, 2023 with English Translation.

Ericsson, NTT Docomo, Inc., "Correction to side conditions for cat-M", 3GPP TSG RAN WG4 #90, R4-1901572, 2019, pp. 1-10.

\* cited by examiner

METHODS AND DEVICES OF DETECTION OF MISBEHAVING UEs USING DATA ANALYSIS

This application is a National Stage Entry of PCT/JP2020/046741 filed on Dec. 15, 2020, which claims priority from European Patent Application 19219407.4 filed on Dec. 23, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to data analysis and detection of misbehaving UEs in the so-called '5G' (or 'Next Generation') systems.

Abbreviations and Terminology

The following abbreviations and terminology (whenever differently stated) are used in the current disclosure:
3GPP 3rd Generation Partnership Project
5GC 5G Core Network
5GS 5G System
5G-AN 5G Access Network
AF Application Function
AMF Access and Mobility Management Function
AN Access Network
CC Country Code
DDoS Distributed Denial of Service
DL Downlink
DNN Data Network Name
EIR Equipment Identity Register
gNB Next Generation NodeB
GPS Global Positioning System
GPSI Generic Public Subscription Identifier
IMEI International Mobile Equipment Identity
IMEI SV International Mobile Equipment Identity Software Version
IMSI International Mobile Subscriber Identity
MCC Mobile Country Code
MM Mobility Management
MT Machine Terminated
MNC Mobile Network Code
MNO Mobile Network Operator
MSISDN Mobile Station International Subscriber Directory Number
NAI Network Access Identifier
NAS Non-Access-Stratum
NF Network Function
NG Next Generation
NG-RAN Next Generation-Radio Access Network
NR New Radio
NSSAI Network Slice Selection Assistance Information
NWDAF Network Data Analytics Function
OAM Operations, Administration and Maintenance
ODB Operator Determined Barring
OS Operating System
OTA Over the Air
OTT Over the Top
PCF Policy Control Function
PDB Packet Delay Budget
PDU Protocol Data Unit
PEI Permanent Equipment Identifier
PER Packet Error Rate
PLMN Public Land Mobile Network
RAN Radio Access Network
RRC Radio Resource Control
SBA Service-based Architecture
SM Session Management
SMF Session Management Function
SMS Short Message Service
S-NSSAI Single Network Slice Selection Assistance Information
SUPI Subscription Permanent Identifier
UE User Equipment
UDM Unified Data Management
UL Uplink Note that this disclosure uses the terms MM NAS and SM NAS. The term MM NAS can be interpreted as NAS MM. The term SM NAS can be interpreted as NAS SM.

BACKGROUND ART

The 3GPP Working Groups are currently defining the 5G system and the 3GPP TSG SA WG2 (SA2) is specifying the 5G system architecture in 3GPP Technical Specification (TS) 23.501 [1] and procedures in 3GPP TS 23.502 [2]. Within SA2, in order to provide network data analytics in 5G networks, a Network Function (NF) called Network Data Analytics Function (NWDAF) is being specified in 3GPP TS 23.288 v16.1.0 [3].

Recently, a new study has been proposed in SA2 to identify new types of outputs provided by NWDAF for the new use cases, such as NWDAF supporting detection of anomaly events and helping in analyzing its cause. The 3GPP Technical Report (TR) 23.700-91 [4] captures the latest results of this study.

SUMMARY OF INVENTION

Regarding the failure of MM NAS/SM NAS related procedures (e.g. UE registration and PDU session setup), there are different causes for rejection and different back-off timers for re-transmission. Even though the causes of rejection or back-off timers for re-transmission may be correlated to certain types of problems in UEs or the network, but there is no study on this topic.

Currently, how to identify misbehaving UEs is treated case-by-case, which not only results in a significant amount of work in troubleshooting, but also has no connection among these cases.

An efficient way is needed to systematically identify misbehaving UEs to reduce the workload on troubleshooting and improve the network automation.

According to an aspect of the present disclosure, a Network Data Analytic Function, NWDAF, node, includes: means for receiving, from a first network function node in a core network, an equipment identifier of user equipment, UE, and a rejected cause in a case where the first network function node sends, to the UE, a reject message in response to a request from the UE; means for analyzing the equipment identifier and rejected cause to determine whether the UE is a misbehaving UE or not; and means for sending, to a second network function node in the core network node, the equipment identifier in a case where the UE is determined to the misbehaving UE.

According to another aspect of the present disclosure, a second network function node in a core network, includes: means for receiving, from a Network Data Analytic Function, NWDAF, node, an equipment identifier; and means for taking action against user equipment, UE, indicated by the equipment identifier, wherein the UE is determined by the NWDAF node, as a misbehaving UE by analyzing the equipment identifier and rejected cause which are sent from a first network function node in the core network to the NWDAF node and sent from the first network function node to the UE.

According to another aspect of the present disclosure, a controlling method for a Network Data Analytic Function, NWDAF, node, the controlling method includes: receiving, from a first network function node in a core network, an equipment identifier of user equipment, UE, and a rejected cause in a case where the first network function node sends, to the UE, a reject message in response to a request from the UE; analyzing the equipment identifier and rejected cause to determine whether the UE is a misbehaving UE or not; and sending, to a second network function node in the core network node, the equipment identifier in a case where the UE is determined to the misbehaving UE.

According to another aspect of the present disclosure, a controlling method for a second network function node in a core network, the controlling method includes: receiving, from a Network Data Analytic Function, NWDAF, node, an equipment identifier; and taking action against user equipment, UE, indicated by the equipment identifier, wherein the UE is determined by the NWDAF node, as a misbehaving UE by analyzing the equipment identifier and rejected cause which are sent from a first network function node in the core network to the NWDAF node and sent from the first network function node to the UE.

DESCRIPTION OF EMBODIMENTS

In order to address the aforementioned problems, the present disclosure has two solutions:

Solution 1: Identifying misbehaving UEs based on MM NAS related errors

Solution 2: Identifying misbehaving UEs based on SM NAS related errors

Solution 1 Identifying Misbehaving UEs Based on MM NAS Related Errors

Example Aspect 1: The AMF 12 Reports Data on MM NAS Related Misbehaving UE Information to the NWDAF 11

The main idea of this solution is that any consumers including the UDM, EIR, AF, OAM and PCF subscribe the NWDAF's service to identify misbehaving UE(s) and take appropriate actions for troubleshooting and improve the network automation. Based on the collected MM NAS related errors, the NWDAF performs data analysis and notifies subscribed consumers its analytics results and recommendations.

FIG. 1 to FIG. 4 demonstrate exemplary procedures for Identifying misbehaving UEs based on error related data from the AMF 12 with regard to MM NAS and data analysis performed by the NWDAF 11.

Figure 1:
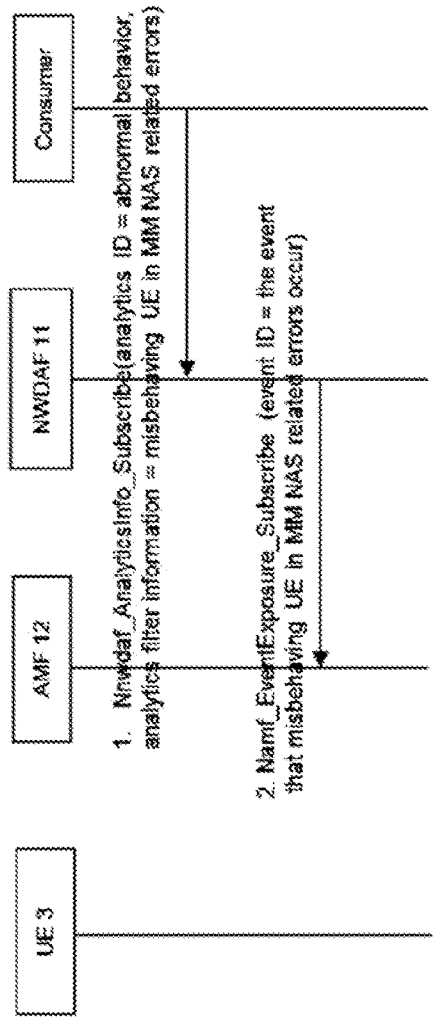
FIG. 1 shows an exemplary procedure for a service consumer subscribing the NWDAF's data analytics for MM NAS related errors and the NWDAF subscribing the AMF's event exposure service for MM NAS related errors.

Procedure for a Service Consumer Subscribing the NWDAF's Data Analytics for MM NAS Related Errors and the NWDAF 11 Subscribing the AMF's Event Exposure Service for MM NAS Related Errors FIG. 1 shows an exemplary procedure for a service consumer subscribing the NWDAF's data analytics for MM NAS related errors and the NWDAF 11 subscribing the AMF's event exposure service for MM NAS related errors. The following steps are taken.

Step 1: In order to obtain the analytics information on misbehaving UE(s), the consumer invokes an analytics information subscription procedure or any other procedure or sends the "Nnwdaf_AnalyticsInfo_Subscribe" message or any other message to the NWDAF 11 for subscribing misbehaving UE analytics information report or notification from the NWDAF 11.

The consumer can be the UDM, EIR, OAM, AF and PCF.

This message includes an analytics ID, the analytics filter information, the target of analytics reporting, a Notification Target Address (+ Notification Correlation ID), Analytics target period, an application ID, DNN, NSSAI, location information, Access Type, PEI, GPSI, and SUPI.

Analytics ID(s) identify the requested analytics [3].

Analytics Filter Information indicates the conditions to be fulfilled for reporting analytics information, and it enables to select which type of analytics information is requested (e.g. subset of all available analytics produced by NWDAF 11 for the given Analytics ID) [3].

Depend on the classification, they are two ways to identify the subscribed misbehaving UE analytics information. For example, 1) the analytics ID can be "abnormal behavior", and the analytics filter information can be "misbehaving UE in MM NAS related errors". A type of misbehaving UE's behavior can be associated to the analytics filter information. For example, a type of misbehaving UE's behavior can be a UE disregarding back-off timer, or a UE spamming the network. 2) The analytics ID can be "misbehaving UE in MM NAS related errors", and an analytics filter information can be a type of misbehaving UE's behavior in MM NAS related errors.

The target of Analytics Reporting indicates the object(s) for which Analytics information is requested. For example, the object(s) can be specific UEs, a group of UE(s) or any UE (i.e. all UEs) [3]. GPSI and SUPI can be used in the target of Analytics Reporting.

A Notification Target Address (+ Notification Correlation ID) allows to correlate notifications received from the NWDAF 11 with service consumer's subscription [3].

Analytics target period is a specified time interval from the start time to the end time.

The location information can be specified if the consumer needs analytics data in a specific location. The location information can be a geographical location or a network defined location. In case the geographical location is used, the location information can be expressed by a GPS locator or a human-readable address, for example, London or South Ruislip.

In case the network defined location is used, the location information can be the PLMN, a list of tracking area, or service area. The Access Type can be specified if the consumer needs analytics data in specific access type. The access type can be 3GPP access, Non-3GPP access, gNB access or NR access.

The PEI can be specified if the consumer needs analytics data for specific terminal type. For example, if a consumer is an EIR and the EIR needs analytic data only for specific terminal type and software version, then the EIR can use the PEI to specify the analytic data needed.

The GPSI can be specified if the consumer needs analytics data for specific user identity(s). The GPSI can take a form of range of identities. For example if GPSI takes a form of MSISDN, then consumer can collect analytic data only UEs who came from specific country if only Country Code (CC) part of the MSISDN is specified as the GPSI.

The SUPI can be specified if the consumer needs analytics data for specific users. The SUPI can take a form of range of identities. For example if the SUPI takes a form of IMSI, then consumer can collect analytic data only UEs who came from a specific MNO if only the Mobile Country Code (MCC) and Mobile Network Code (MNC) parts of the IMSI is specified as the SUPI.

Step 2: In order to collect the misbehaving UE information with regard to the MM NAS related errors, the NWDAF 11 invokes the misbehaving UE information subscription procedure or any other procedure or sends the "Namf_EventExposure_Subscribe" message or any other message to the related AMF(s) for subscribing misbehaving UE related data from the related AMF(s). The related AMF(s) can be all the serving AMFs 12 in a PLMN. The step 2 may not be executed if it has been taken place prior to the step 1.

This message includes event ID(s), event filter(s), the target of event reporting, a Notification Target Address (+ Notification Correlation ID), Event target period, Event reporting mode, an application ID, DNN, NSSAI, location information, Access Type, PEI, GPSI, and SUPI.

An Event ID identifies the type of event being subscribed to (e.g. PDU Session release) [2]. In this message, event IDs identify the type of events related to the abnormal UE behaviors in MM NAS related errors.

An Event filter indicates the condition to be fulfilled for notifying the subscribed Event ID, and includes event related parameter(s) and their value(s) to be matched against. The Event Filter depends on the Event ID [2].

The target of event reporting indicates a specific UE or PDU Session, a group of UE(s) or any UE (i.e. all UEs). [2] GPSI and SUPI can be used in the target of event Reporting.

For an Analytics ID, the NWDAF 11 is configured with the corresponding NF Type(s) and/or event ID(s) [3].

Based on the subscription request from Step 1, the NWDAF 11 maps the received analytics ID and the analytics filter information to the corresponding event ID(s) and/or event filter(s). The target of analytics reporting is also mapped to the target of event reporting.

For example, if the analytics ID is "abnormal behavior", and the analytics filter information is "misbehaving UE in MM NAS related errors", the NWDAF 11 maps them to a list of event IDs related to the abnormal UE behaviors in MM NAS related errors. For example, an event ID can be "UE disregards a back-off timer specified by the AMF" or "UE disregards an Event reporting requested by the AMF". Several event filters can be associated with each event ID. For example, regarding to the event ID "UE disregards a back-off timer specified by the AMF", the associated event filter can be the event that a UE disregarded a specific back-off timer specified by the AMF either during initial registration or that during periodic registration update.

The target of event reporting can be the same as the target of analytics reporting.

A Notification Target Address (+ Notification Correlation ID) allows it to correlate notifications received from the Event provider with the service consumer's subscription [2].

Analytics target period is a specified time interval from the start time to the end time.

Event reporting mode is the mode of event reporting. For example, it can report event-by-event, of reporting up to a maximum number of reports [2], or periodic reporting [2], or reporting up to a maximum duration [2].

The list below, not exhaust events, shows possible event ID for abnormal UE's behavior MM NAS message from the UE 3 is rejected by the AMF 12.

UE 3 sends too many MM NAS messages within a short time of period.
UE 3 disregards a back-off timer specified by the AMF 12.
UE 3 disregards a RAT restriction specified by the AMF 12.
UE 3 disregards a Forbidden Area specified by the AMF 12.
UE 3 disregards a Service Area Restriction specified by the AMF 12.
UE 3 disregards a Core Network type restriction specified by the AMF 12.
UE 3 disregards an Event reporting requested by the AMF 12.

Figure 2:
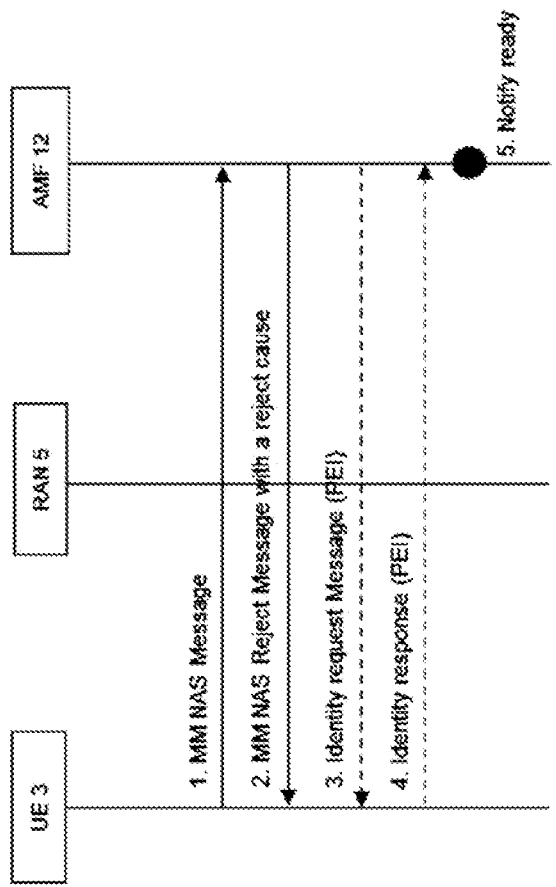
FIG. 2 shows an exemplary AMF procedure when the AMF detects an MM NAS rejection.
Figure 3:
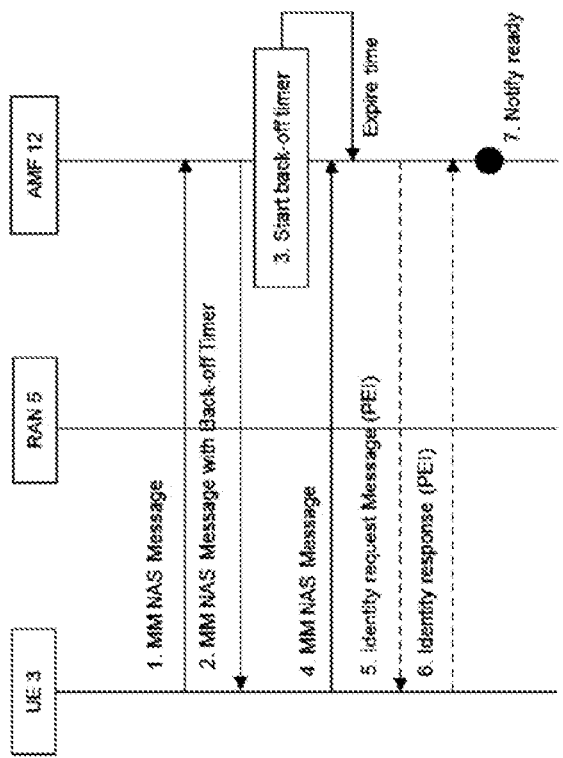
FIG. 3 shows an exemplary AMF procedure when the AMF detects a UE disregarding a back-off timer.

FIGS. 2 and 3 show the AMF behavior for MM NAS rejection and UE misbehavior related to a back-off timer respectively.

Procedure in the AMF 12 for MM NAS Rejection

FIG. 2 shows an exemplary AMF procedure when the AMF 12 detects an MM NAS rejection. The following steps are taken.

Step 1: The UE 3 sends a MM NAS message to the AMF 12.

Step 2: The AMF 12 sends a MM NAS Reject message to the UE 3. As the AMF 12 is subscribed to the Event Exposure, the AMF 12 checks that all requested information is available or not.

Step 3: This is an optional step that the AMF 12 can take. If the AMF 12 does not have a PEI information of the UE 3 while the PEI information is requested on a report for the Event Exposure, the AMF 12 sends the Identity request message to the UE 3 with the PEI as a requested identity.

Step 4: The UE 3 sends the Identity response message to the AMF 12 with PEI information.

Step 5: The AMF 12 is ready to notify to the NWDAF 11. The Notification procedure in FIG. 4 follows.

Procedure in AMF for detecting a UE disregarding a back-off timer

FIG. 3 shows an exemplary AMF procedure when the AMF 12 detects a UE 3 disregarding a back-off timer. The following steps are taken.

Step 1: The UE 3 sends a MM NAS message to the AMF 12.

Step 2: The AMF 12 sends a MM NAS message to the UE 3 with back-off timer specified.

Step 3: The AMF 12 starts the back-off timer.

Step 4: The UE 3 sends the same MM NAS message with a one received in the step 2. At this point, the AMF 12 detects that the UE 3 does not follow the back-off time specified in the step 2 as the back-off timer set in step 3 is still running. The AMF 12 considers the UE 3 as misbehaving UE and subject to notify. As the AMF 12 is subscribed to the Event Exposure, the AMF 12 checks that all requested information is available or not.

Step 5: This is an optional step that the AMF 12 can take. If the AMF 12 does not have PEI information of the UE 3 while the PEI information is requested on a report for the Event Exposure, the AMF 12 sends the Identity request message to the UE 3 with the PEI as a requested identity.

Step 6: The UE 3 sends the Identity response message to the AMF 12 with PEI information.

Step 7: The AMF 12 is ready to notify to the NWDAF 11. The Notification procedure in FIG. 4 follows.

Procedure for Notification from the AMF 12

Figure 4:
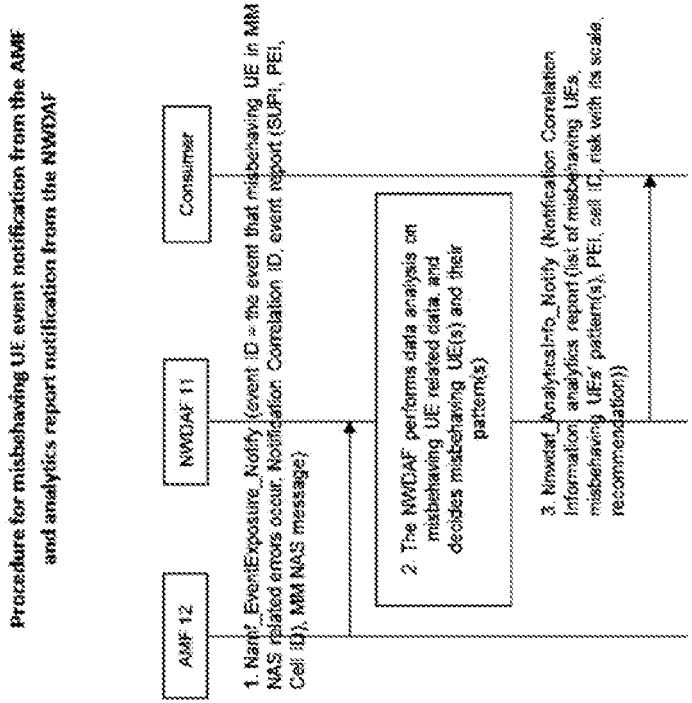
FIG. 4 shows the misbehaving UE event notification procedure from the AMF and analytics report notification from the NWDAF.

FIG. 4 shows the misbehaving UE event notification procedure from the AMF 12 and analytics report notification from the NWDAF 11. The Notification can be made by event-by-event or made every predetermined time or based on a request by consumers. Unless the Notification is made per every event, the Notification message may carry multiple events in one message. The following steps are taken.

Step 1: The AMF 12 invokes a misbehaving UE information reporting or notification procedure or any other procedure or sends the Namf_EventExposure_Notify message or any other message to the NWDAF 11 in order to report/notify misbehaving UE information. This message includes event ID(s), event filter(s), Notification Correlation ID, an event report and a MM NAS message.

The event report includes the list of misbehaving UE(s) (such as SUPI), equipment ID(s) (such as PEI or IMEI SV), and the UE locations (such as cell ID).

Step 2: The NWDAF 11 performs data analysis on misbehaving UE information, and decides: 1) whether it is a single misbehaving UE or there is a group of misbehaving UEs; 2) whether there is a misbehaving UEs' equipment pattern or not; 3) whether there is a misbehaving UEs' subscription pattern or not; 4) a misbehaving UEs' location distribution pattern or not; 5) what is the possible consequence of misbehaving UEs.

Step 3: Based on the results from data analytics, the NWDAF 11 notifies the related services consumer(s) the analytics result(s) and/or recommendation(s).

The NWDAF 11 invokes a misbehaving UE analytics reporting or notification procedure or any other procedure or sends the Nnwdaf_AnalyticsInfo_Notify message or any other message to the UDM in order to report/notify misbehaving UE analytics information. This message includes Notification Correlation Information, analytics report and optionally a MM NAS message.

Notification Correlation Information is a Notification Target Address (+ Notification Correlation ID) that allows to correlate notifications received from the NWDAF 11 with the service consumer' subscription [3]. Notification Correlation Information can be used instead of analytics ID(s) and analytics filter(s), which are optional parameters in the above message.

The analytics report includes the list of misbehaving UEs (such as SUPI), mobile equipment ID(s) (such as PEI), and the UE locations (such as cell ID), misbehaving UEs' pattern(s), the detected risk with the scale of the detected risk, and recommendation.

The misbehaving UEs' pattern can be a mobile equipment pattern, a UE subscription pattern or a location distribution pattern.

The detected risk with the scale of the detected risk can be an isolated abnormal event for a single UE, a type of UE(s) with the same type of device terminal and the same vendor, or a large scale DDoS attack.

Recommendation is the action that the NWDAF 11 recommends its service consumer who needs to take. For example, depend on the scale of the detected risk, the NWDAF 11 can make certain recommendation. If the detected risk is an isolated abnormal event involving a single UE, the NWDAF 11 may recommend to bar the misbehaving UE to access the network. If the detected risk is a type of misbehaving UE(s) with the same type of device terminal and the same vendor, the NWDAF 11 may recommend to bar the UE(s) from the identified type of device terminals. If the detected risk is a large scale DDoS attack, the NWDAF 11 may recommend to bar all UE(s) in identified cells according to the location distribution pattern.

There are a few use case examples how consumers utilize the analytics report from the NWDAF 11.

Use Case 1: UDM Actions to Misbehaving UEs

The UDM may take the following action based on the Nnwdaf_AnalyticsInfo_Notify message received from the NWDAF 11.

The UDM activates service suspension based on the ODB, Operator Determined Barring, as specified in 3GPP TS 23.015 [5]. The new indication "misbehaving UE" with the list of misbehaving UEs is included in this procedure or message. OR The UDM sends an SMS message to the UE to make a warning of misbehaving. Once user reads the SMS, user can take an appropriate action to fix misbehaving. Example changing MT to other products. OR The UDM deletes the subscriber data to terminate the services.

Use Case 2: OAM Actions to Misbehaving UEs

The OAM system may take the following action based on the Nnwdaf_AnalyticsInfo_Notify message received from the NWDAF 11.

The OAM system activates Unified Access Control using PLMN-specific Operator-defined access category. If the OAM system identifies UEs with specific OS Id or OS Id+ OS App Id that cause troubles in 5GS, the OAM system instructs AMFs in their network to perform Unified Access Control for specific UEs by using the Operator-defined access categories as defined in the 3GPP TS 24.501 [6].

Use Case 3: EIR Actions to Misbehaving UEs

The EIR may take the following action based on the Nnwdaf_AnalyticsInfo_Notify message received from the NWDAF.

The EIR analyzes UE misbehavior and may issue new software version and distribute new software to all misbehaving UEs using the OTA (Over the Air) system.

The EIR can update its black list and inform the AMF 12 the updated equipment black list.

Use Case 4: PCF/AF Actions to Misbehaving UEs

The PCF/AF may take the following action based on the Nnwdaf_AnalyticsInfo_Notify message received from the NWDAF 11.

The PCF/AF_activates Unified Access Control using PLMN-specific Operator-defined access category. If the PCF or AF identifies UEs with specific network slice, S-NSSAI, that cause troubles in 5GS, then the PCF or the AF instructs AMFs in their network to perform Unified Access Control for specific UEs by using the Operator-defined access categories as defined in the 3GPP TS 24.501 [6].

Solution 2 Identifying Misbehaving UEs Based on SM NAS Related Errors

Example aspect 2: The SMF 13 reports data on SM NAS related misbehaving UE information to the NWDAF 11

The main idea of this solution is that any consumers including the UDM, EIR, AF, OAM and PCF subscribe the NWDAF's service to identify misbehaving UE(s) and take appropriate actions for troubleshooting and improve the network automation. Based on the collected SM NAS related errors, the NWDAF 11 performs data analysis and notifies subscribed consumers its analytics results and recommendations.

FIG. 5 to FIG. 8 demonstrate exemplary procedures for Identify misbehaving UEs based on error related data from the SMF 13 with regard to SM NAS and data analysis performed by the NWDAF 11.

Figure 5:
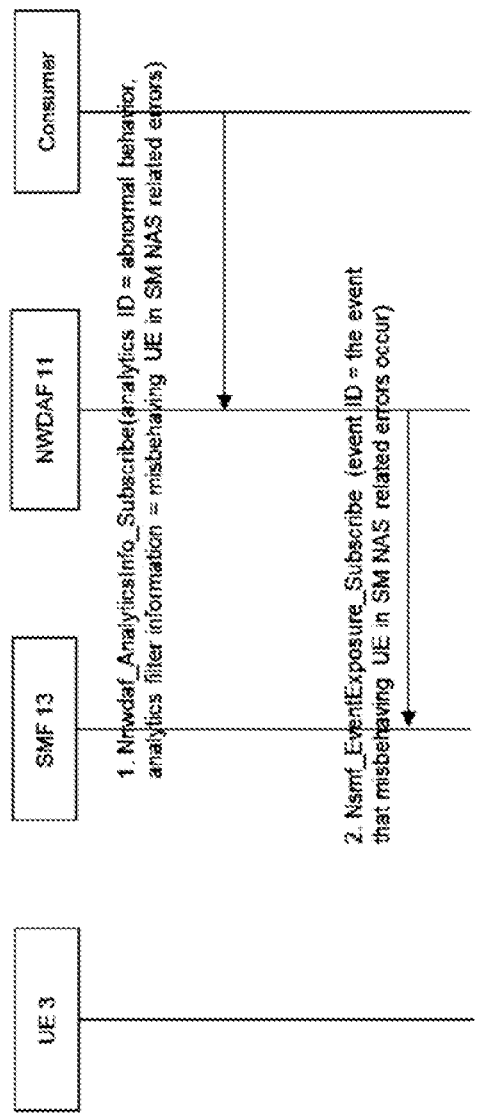
FIG. 5 shows an exemplary procedure for a service consumer subscribing to the NWDAF's data analytics for SM NAS related errors and the NWDAF subscribing the SMF's event exposure service for SM NAS related errors.

Procedure for a Service Consumer Subscribing the NWDAF's Data Analytics for SM NAS Related Errors and the NWDAF 11 Subscribing the SMF's Event Exposure Service for SM NAS Related Errors FIG. 5 shows an exemplary procedure for a service consumer subscribing to the NWDAF's data analytics for SM NAS related errors and the NWDAF 11 subscribing the SMF's event exposure service for SM NAS related errors. The following steps are taken.

Step 1: In order to obtain the analytics information on misbehaving UE(s), the consumer invokes an analytic information subscription procedure or any other procedure or sends the "Nnwdaf_AnalyticsInfo_Subscribe" message or any other message to the NWDAF 11 for subscribing misbehaving UE analytics information report or notification from the NWDAF 11.

The consumer can be the UDM, EIR, OAM, AF and PCF.

This message includes an analytics ID, the analytics filter information, the target of analytics reporting, a Notification Target Address (+ Notification Correlation ID), Analytics target period, an application ID, DNN, NSSAI, location information, Access Type, PEI, GPSI, and SUPI.

Analytics ID(s) identify the requested analytics [3].

Analytics Filter Information indicates the conditions to be fulfilled for reporting analytics information, and it enables to select which type of analytics information is requested (e.g. subset of all available analytics produced by NWDAF for the given Analytics ID) [3].

Depend on the classification, they are two ways to identify the subscribed misbehaving UE analytics information. For example, 1) the analytics ID can be "abnormal behavior", and the analytics filter information can be "misbehaving UE in SM NAS related errors". A type of misbehaving UE's behavior can be associated to the analytics filter information. For example, a type of misbehaving UE's behavior can be a UE disregarding a back-off timer, or a UE spamming the network. 2) The analytics ID can be "misbehaving UE in SM NAS related errors", and an analytics filter information can be a type of misbehaving UE's behavior in SM NAS related errors.

The target of Analytics Reporting indicates the object(s) for which Analytics information is requested. For example, the object(s) can be specific UEs, a group of UE(s) or any UE (i.e. all UEs) [3]. GPSI and SUPI can be used in the target of Analytics Reporting.

A Notification Target Address (+ Notification Correlation ID) allows to correlate notifications received from the NWDAF with service consumer's subscription [3].

Analytics target period is a specified time interval from the start time to the end time.

The location information can be specified if the consumer needs analytics data in a specific location. The location information can be a geographical location or a network defined location. In case the geographical location is used, the location information can be expressed by a GPS locator or a human-readable address, for example, London or South Ruislip.

In case network defined location is used, the location information can be the PLMN, a list of tracking area, or service area. The Access Type can be specified if the consumer needs analytics data in specific access type. The access type can be 3GPP access, Non-3GPP access, gNB access or NR access.

The PEI can be specified if the consumer needs analytics data for specific terminal type. For example, if a consumer is an EIR and the EIR needs analytic data only for specific terminal type and software version, then the EIR can use the PEI to specify the analytic data needed.

The GPSI can be specified if the consumer needs analytics data for specific user identity(s). The GPSI can take a form of range of identities. For example if GPSI takes a form of MSISDN, then consumer can collect analytic data only UEs who came from specific country if only Country Code (CC) part of the MSISDN is specified as the GPSI.

The SUPI can be specified if the consumer needs analytics data for specific users. The SUPI can take a form of range of identities. For example if the SUPI takes a form of IMSI, then consumer can collect analytic data only UEs who came from a specific MNO if only the Mobile Country Code (MCC) and Mobile Network Code (MNC) parts of the IMSI is specified as the SUPI.

Step 2: In order to collect the misbehaving UE information with regard to the SM NAS related errors, the NWDAF 11 invokes the misbehaving UE information subscription procedure or any other procedure or sends the "Nsmf_EventExposure_Subscribe" message or any other message to the related SMF(s) for subscribing misbehaving UE related data from the related SMF(s). The related SMF(s) can be all the serving SMFs 13 in a PLMN. The step 2 may not be executed if it has been taken place prior to the step 1.

This message includes event ID(s), event filter(s), the target of event reporting, a Notification Target Address (+ Notification Correlation ID), Event target period, Event reporting mode, an application ID, DNN, NSSAI, location information, Access Type, PEI, GPSI, and SUPI.

An Event ID identifies the type of event being subscribed to (e.g. PDU Session release) [2]. In this message, event IDs identify the type of events related to the abnormal UE behaviors in SM NAS related errors.

An Event filter indicates the condition to be fulfilled for notifying the subscribed Event ID, and includes event related parameter(s) and their value(s) to be matched against. The Event Filter depends on the Event ID [2].

The target of event reporting indicates a specific UE or PDU Session, a group of UE(s) or any UE (i.e. all UEs) [2]. GPSI and SUPI can be used in the target of event Reporting.

For an Analytics ID, the NWDAF 11 is configured with the corresponding NF Type(s) and/or event ID(s) [3].

Based on the subscription request from Step 1, the NWDAF 11 maps the received analytics ID and the analytics filter information to the corresponding event ID(s) and/or event filter(s). The target of analytics reporting is also mapped to the target of event reporting.

For example, if the analytics ID is "abnormal behavior", and the analytics filter information is "misbehaving UE in SM NAS related errors", the NWDAF 11 maps them to a list of event IDs related to the abnormal UE behaviors in SM NAS related errors. For example, an event ID can be "UE disregards a back-off timer specified by the SMF 13" or "UE disregards an Event reporting requested by the SMF 13". Several event filters can be associated with each event ID. For example, regarding to the event ID "UE disregards a back-off timer specified by the SMF 13", the associated event filter can be the event that a UE disregarded a specific back-off timer specified by the SMF 13 either during initial registration or that during periodic registration update.

The target of event reporting can be the same as the target of analytics reporting.

A Notification Target Address (+ Notification Correlation ID) allows it to correlate notifications received from the Event provider with the service consumer's subscription [2].

Analytics target period is a specified time interval from the start time to the end time.

Event reporting mode is the mode of event reporting. For example, it can report event-by-event, of reporting up to a maximum number of reports [2], or periodic reporting [2], or reporting up to a maximum duration [2].

The list below, not exhaust events, shows possible event ID(s) for abnormal UE's behavior:

SM NAS message from the UE 3 is rejected by the SMF 13.

UE 3 sends too many SM NAS messages within a short time of period.

UE 3 disregards a back-off timer specified by the SMF 13.

UE 3 disregards a RAT restriction specified by the SMF 13.

UE 3 disregards a Forbidden Area specified by the SMF 13.

UE 3 disregards a Service Area Restriction specified by the SMF 13.

UE 3 disregards a Core Network type restriction specified by the SMF 13.

Figure 6:
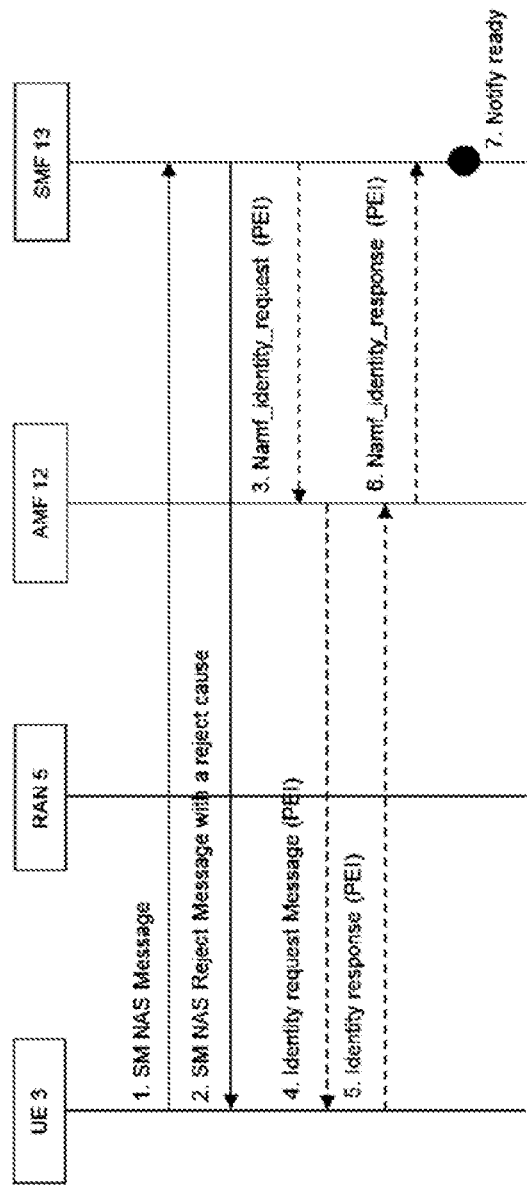
FIG. 6 shows an exemplary SMF procedure when the SMF detects an SM NAS rejection. The following steps are taken.
Figure 7:
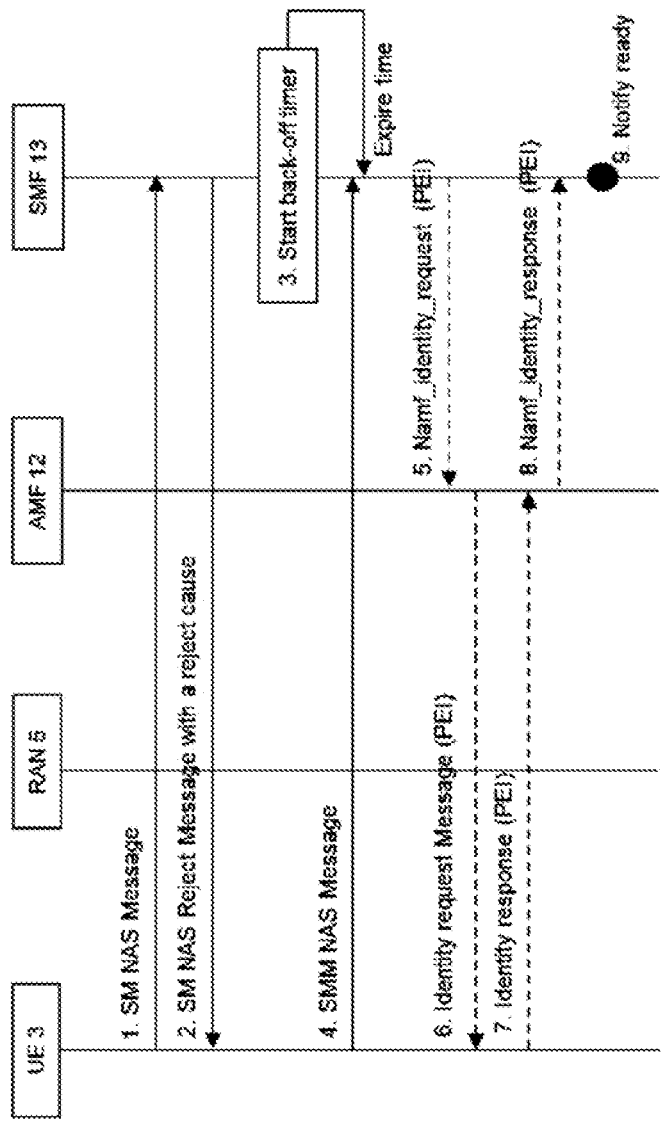
FIG. 7 shows an exemplary SMF procedure when the SMF detects a UE disregarding a back-off timer.

FIGS. 6 and 7 show the SMF behavior for SM NAS rejection and UE misbehavior related to a back-off timer respectively.

Procedure in the SMF 13 for SM NAS Rejection

FIG. 6 shows an exemplary SMF procedure when the SMF 13 detects an SM NAS rejection. The following steps are taken.

Step 1: The UE 3 sends a SM NAS message to the SMF 13.

Step 2: The SMF 13 sends a SM NAS Reject message to the UE 3. As the SMF 13 is subscribed to the Event Exposure, the SMF 13 checks that all requested information is available or not.

Step 3: This is an optional step that the SMF 13 can take. If the SMF 13 does not have a PEI information of the UE 3 while the PEI information is requested on a report for the Event Exposure, the SMF 13 sends the Namf_identity_request message to the AMF 12 to request a PEI for the UE 3.

Step 4: The AMF 12 sends the Identity request message to the UE 3 with the PEI as a requested identity.

Step 5: The UE 3 sends the Identity response message to the SMF 13 with PEI information.

Step 6: The AMF sends the Namf_identity_response message to the SMF to inform the PEI for the UE.

Step 7: The SMF 13 is ready to notify to the NWDAF 11. The Notification procedure in FIG. 8 follows.

Procedure in SMF 13 for Detecting a UE 3 Disregarding a Back-Off Timer

FIG. 7 shows an exemplary SMF procedure when the SMF 13 detects a UE 3 disregarding a back-off timer. The following steps are taken.

Step 1: UE 3 sends a SM NAS message to the SMF 13.

Step 2: The SMF 13 sends a SM NAS message to the UE 3 with back-off timer specified.

Step 3: The SMF 13 starts the back-off timer.

Step 4: The UE 3 sends the same SM NAS message with a one received in the step 2. At this point, the SMF 13 detects that the UE 3 does not follow the back-off time specified in the step 2 as the back-off timer set in step 3 is still running. The SMF 13 considers the UE 3 as misbehaving UE and subject to notify. As the SMF 13 is subscribed to the Event Exposure, the SMF 13 checks that all requested information is available or not.

Step 5: This is an optional step that the SMF 13 can take. If the SMF 13 does not have PEI information of the UE 3 while the PEI information is requested on a report for the Event Exposure, the SMF 13 sends the Namf_identity_request message to the AMF 12 to request the PEI for the UE 3.

Step 6: The AMF 12 sends the Identity request message to the UE 3 with the PEI as a requested identity.

Step 7: The UE 3 sends the Identity response message to the SMF 13 with PEI information.

Step 8: The AMF 12 sends the Namf_identity_response message to the SMF 13 to inform the PEI for the UE 3.

Step 9: The SMF 13 is ready to notify to the NWDAF 11. The Notification procedure in FIG. 8 follows.

Procedure for Notification from the SMF 13

Figure 8:
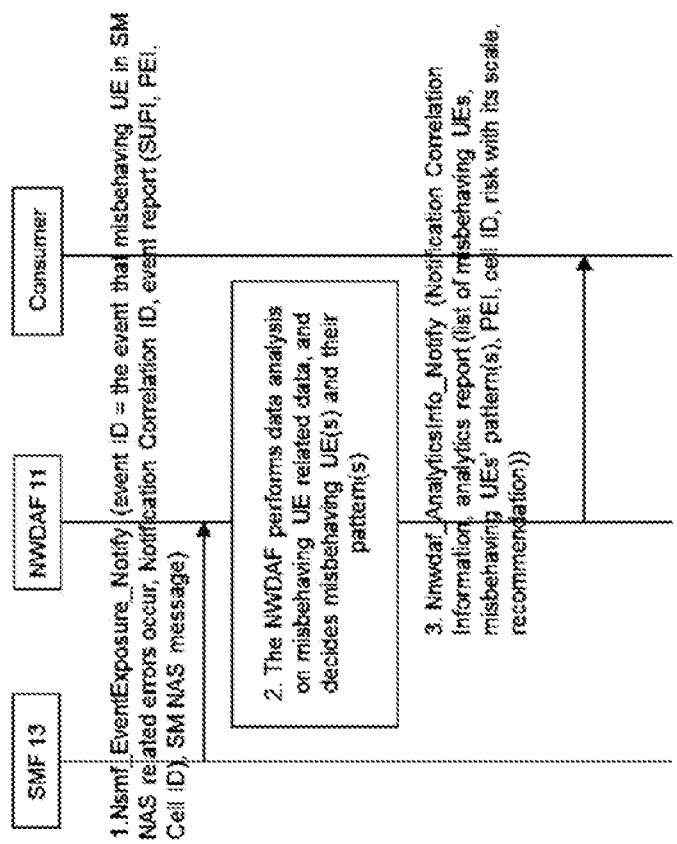
FIG. 8 shows an exemplary misbehaving UE event notification procedure from the SMF and analytics report notification from the NWDAF.

FIG. 8 shows an exemplary misbehaving UE event notification procedure from the SMF 13 and analytics report notification from the NWDAF 11. The Notification can be made by even-by-even or made every predetermined time or based on a request by consumers. Unless the Notification is made per every event, the Notification message may carry multiple events in one message. The following steps are taken.

Step 1: The SMF 13 invokes a misbehaving UE information reporting or notification procedure or any other procedure or sends the Nsmf_EventExposure_Notify message or any other message to the NWDAF 11 in order to report/notify misbehaving UE information. This message includes event ID(s), event filter(s), Notification Correlation ID, an event report and a SM NAS message.

The event report includes the list of misbehaving UE(s) (such as SUFI), equipment ID(s) (such as PEI or IMEI SV), and the UE locations (such as cell ID).

Step 2: The NWDAF 11 performs data analysis on misbehaving UE information, and decides: 1) whether it is a single misbehaving UE or there is a group of misbehaving UEs; 2) whether there is a misbehaving UEs' equipment pattern or not; 3) whether there is a misbehaving UEs' subscription pattern or not; 4) a misbehaving UEs' location distribution pattern or not; 5) what is the possible consequence of misbehaving UEs.

Step 3: Based on the results from data analytics, the NWDAF 11 notifies the related services consumer(s) the analytics result(s) and/or recommendation(s).

The NWDAF 11 invokes a misbehaving UE analytics reporting or notification procedure or any other procedure or sends the Nnwdaf_AnalyticsInfo_Notify message or any other message to the UDM in order to report/notify misbehaving UE analytics information. This message includes Notification Correlation Information, analytics report and optionally a SM NAS message.

The analytics report includes the list of misbehaving UEs (such as SUFI), mobile equipment ID(s) (such as PEI), and the UE locations (such as cell ID), misbehaving UEs' pattern(s), the detected risk with the scale of the detected risk, and recommendation.

The misbehaving UEs' pattern can be a mobile equipment pattern, a UE subscription pattern or a location distribution pattern.

The detected risk with the scale of the detected risk can be an isolated abnormal event for a single UE, a type of UE(s) with the same type of device terminal and the same vendor, or a large scale DDoS attack.

Recommendation is the action that the NWDAF 11 recommends its service consumer who needs to take. For example, depend on the scale of the detected risk, the NWDAF 11 can make certain recommendation. If the detected risk is an isolated abnormal event involving a single UE, the NWDAF 11 may recommend to bar the misbehaving UE to access the network. If the detected risk is a type of misbehaving UE(s) with the same type of device terminal and the same vendor, the NWDAF 11 may recommend to bar the UE(s) from the identified type of device terminals. If the detected risk is a large scale DDoS attack, the NWDAF 11 may recommend to bar all UE(s) in identified cells according to the location distribution pattern.

There are a few use case examples how consumers utilize the analytics report from the NWDAF 11.

Use Case 1: UDM Actions to Misbehaving UEs

The UDM may take the following action based on the Nnwdaf_AnalyticsInfo_Notify message received from the NWDAF 11.

The UDM activates service suspension based on the ODB, Operator Determined Barring, as specified in 3GPP TS 23.015 [5]. The new indication "misbehaving UE" with the list of misbehaving UEs is included in this procedure or message. OR The UDM sends an SMS message to the UE 3 to make a warning of misbehaving. Once user reads the SMS, user can take an appropriate action to fix misbehaving. Example changing MT to other products. OR The UDM deletes the subscriber data to terminate the services.

Use Case 2: OAM Actions to Misbehaving UEs

The OAM system may take the following action based on the Nnwdaf_AnalyticsInfo_Notify message received from the NWDAF 11.

The OAM system activates Unified Access Control using PLMN-specific Operator-defined access category. If the OAM system identifies UEs with specific OS Id or OS Id+OS App Id that cause troubles in 5GS, the OAM system instructs SMFs in their network to perform Unified Access Control for specific UEs by using the Operator-defined access categories as defined in the 3GPP TS 24.501 [6].

Use Case 3: EIR Actions to Misbehaving UEs

The EIR may take the following action based on the Nnwdaf_AnalyticsInfo_Notify message received from the NWDAF 11.

The EIR analyzes UE misbehavior and may issue new software version and distribute new software to all misbehaving UEs using the OTA (Over The Air) system.

The EIR can update its black list and inform the AMF 12 the updated equipment black list.

Use Case 4: PCF/AF Actions to Misbehaving UEs

The PCF/AF may take the following action based on the Nnwdaf_AnalyticsInfo_Notify message received from the NWDAF 11.

The PCF/AF_activates Unified Access Control using PLMN-specific Operator-defined access category. If the PCF or AF identifies UEs with specific network slice, S-NSSAI, that cause troubles in 5GS, then the PCF or AF instructs SMFs in their network to perform Unified Access Control for specific UEs by using the Operator-defined access categories as defined in the 3GPP TS 24.501 [6].

SUMMARY

Beneficially, the above described example aspects include, although they are not limited to, one or more of the following functionalities:

1) New parameters mobile equipment ID IMEI SV and PEI, the rejection causes and disregarded back-off timers have been used along with UE ID (e.g. SUCI) and cell ID as the input data in the data analysis to analyze abnormal UE's behaviour. In this way, NWDAF can perform data analysis and identify a group of misbehaving UEs from their terminal model(s) and UE vendor(s).

2) Based on collected misbehaving UE information, the NWDAF performs data analysis and can decide: 1) whether it is a single misbehaving UE or there is a group of misbehaving UEs; 2) whether there is a misbehaving UEs' equipment pattern or not; 3) whether there is a misbehaving UEs' subscription pattern or not; 4) a misbehaving UEs' location distribution pattern or not; 5) what is the possible consequence of misbehaving UEs.

3) Currently, the UDM is not a consumer of NWDAF's service. In this document, the UDM can subscribe the NWDAF's service and change misbehaving UE's subscription data. The UDM can activate service suspension based on the ODB, Operator Determined Barring. The new indication "misbehaving UE" with the list of misbehaving UEs is included in this procedure or message. The UDM can send an SMS message to the UE to make a warning of misbehaving. Once user reads the SMS, the user can take an appropriate action to fix misbehaving. The UDM can delete the subscriber data to terminate the services. In this way, the network can react efficiently to deal with misbehaving UE(s).

4) Currently, the only interaction between the EIR and other 5G NFs is that the AMF initiates ME identity check by invoking the N5g-eir_EquipmentIdentityCheck_Get service to check whether the PEI is in the black list or not. In this document, the EIR can subscribe the NWDAF's service and analyze UE misbehavior and may issue new software version and distribute new software to all misbehaving UEs using the OTA (Over the Air) system. The EIR also can subscribe the NWDAF's service to update its black list and inform the AMF the updated equipment black list. In this way, the network can react efficiently to deal with misbehaving UE(s).

5) By using NWDAF's service, the OAM system activates Unified Access Control using PLMN-specific Operator-defined access category. If the OAM system identifies UEs with specific OS Id or OS Id+OS App Id that cause troubles in 5GS, the OAM system instructs AMFs in their network to perform Unified Access Control for specific UEs by using the Operator-defined access categories as defined in the 3GPP TS 24.501 [6]. In this way, the network can react efficiently to deal with misbehaving UE(s).

In order to provide these functionalities, the above example aspects describe exemplary methods comprising (at least some of) the following steps:

1) The UDM/EIR/AF/OAM/PCF subscribe the NWDAF's service to identify misbehaving UE(s).

2) Based on these subscriptions, the NWDAF subscribes misbehaving UE related data exposure services from the AMF/SMF.

3) The AMF/SMF detects misbehaving UE(s) and reports the NWDAF the misbehaving UE-related information.

4) The NWDAF performs data analysis on misbehaving UE related data, and notifies the UDM/EIR/AF/OAM/PCF its analytics results and recommendations.

Benefits

New methods are proposed to detect misbehaving UEs based on 5GS. By using these solutions, it allows the network to react accurately and efficiently to deal with misbehaving UE(s).

System Overview

Figure 9:
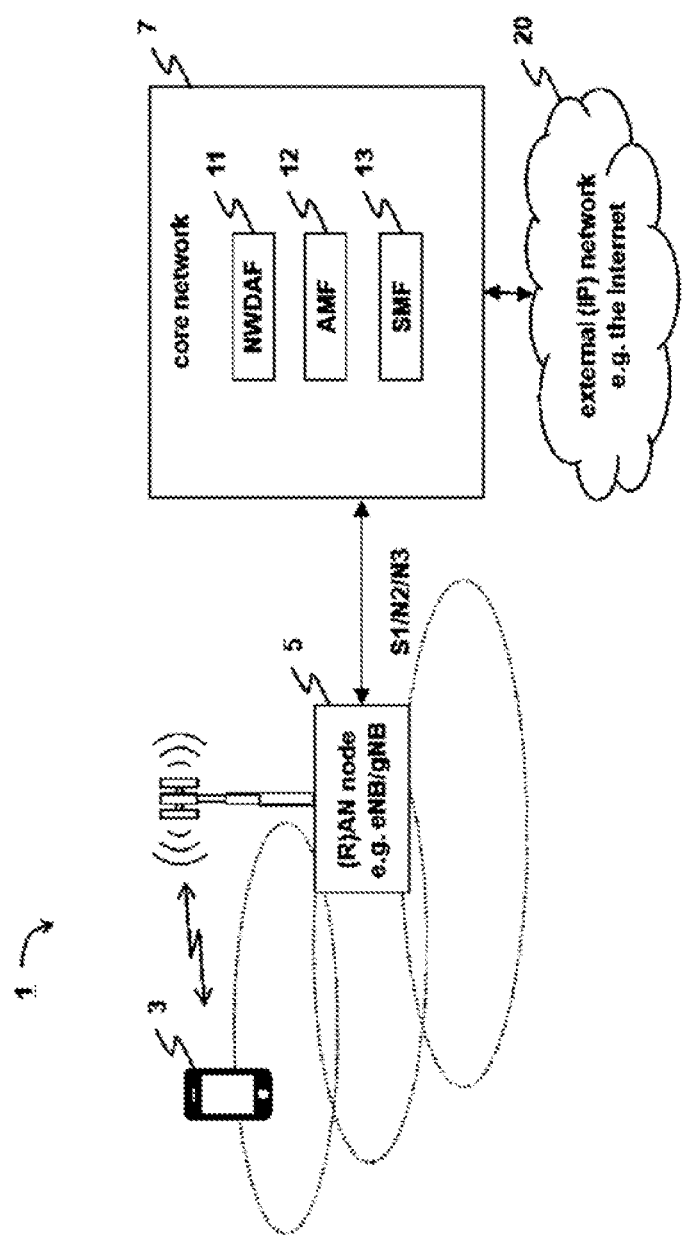
FIG. 9 schematically illustrates a mobile (cellular or wireless) telecommunication system 1.

FIG. 9 schematically illustrates a mobile (cellular or wireless) telecommunication system 1 to which the above example aspects are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 (RAN) are shown in FIG. 9 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols. The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N2', 'N3' interface, and/or the like). Non-Access-Stratum (NAS) interface (such as the so-called 'N1' interface, and/or the like) is provided between the mobile device 3 and the core network node via the base station 5.

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: a Network Data Analytics Function (NWDAF) 11, an Access and Mobility Management Function (AMF) 12; and a Session Management Function (SMF) 13. From the core network 7, connection to an external IP network/data network 20 (such as the Internet) is also provided.

The components of this system 1 are configured to perform one or more of the above described example aspects.

User Equipment (UE)

Figure 10:
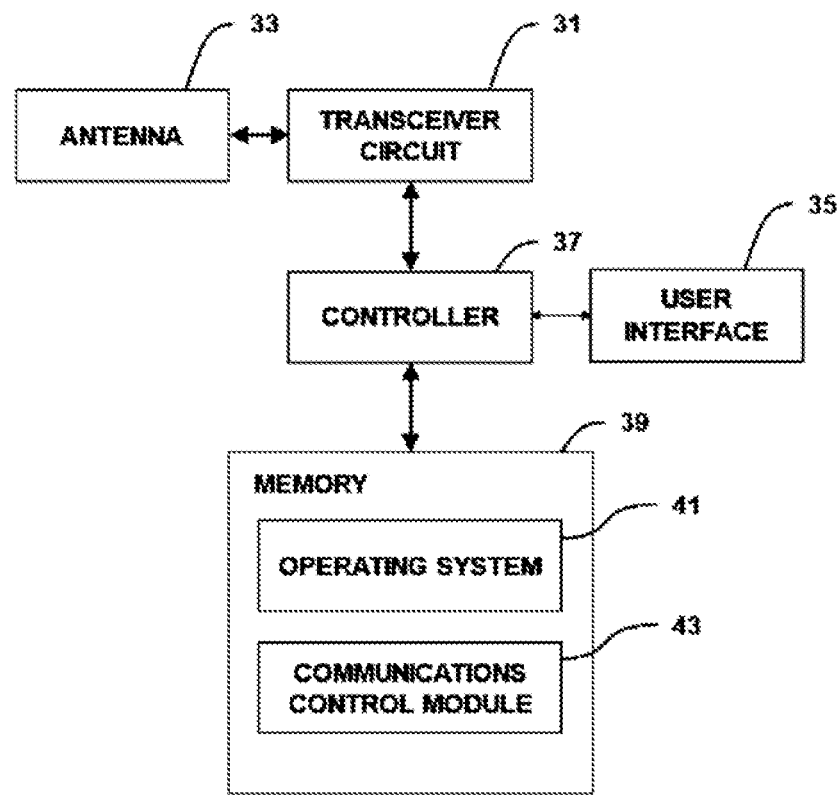
FIG. 10 is a block diagram illustrating the main components of the UE (mobile device 3).

FIG. 10 is a block diagram illustrating the main components of the UE (mobile device 3) shown in FIG. 9. As shown, the UE includes a transceiver circuit 31 which is operable to transmit signals to and to receive signals from the connected node(s) via one or more antenna 33. Although not necessarily shown in FIG. 10, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signaling messages and uplink/downlink data packets between the UE 3 and other nodes, including (R)AN nodes 5 and core network nodes. Such signaling includes appropriately formatted requests and responses relating to data analysis (e.g. detection of misbehaving UEs).

(R)AN Node

Figure 11:
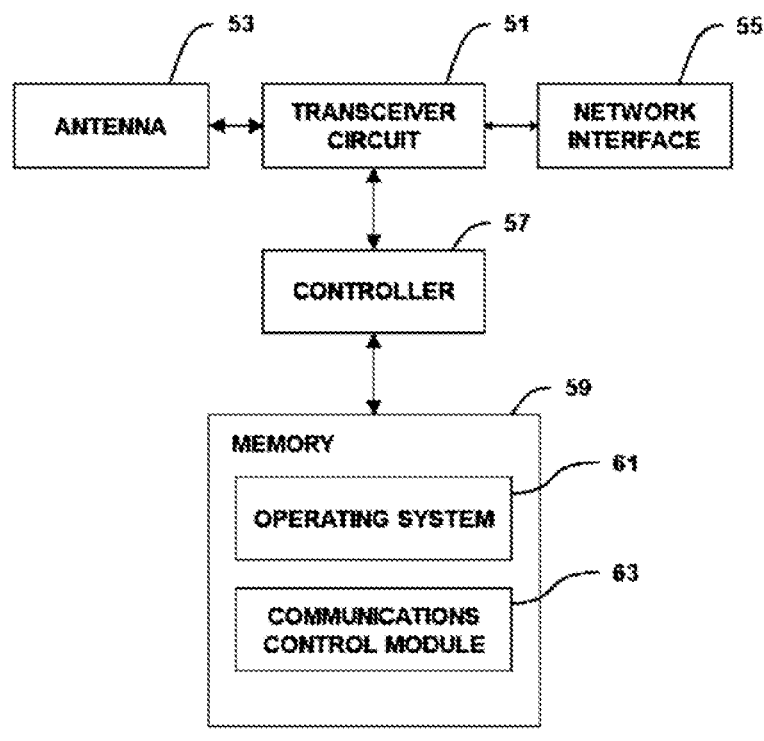
FIG. 11 is a block diagram illustrating the main components of an exemplary (R)AN node 5 (base station).

FIG. 11 is a block diagram illustrating the main components of an exemplary (R)AN node 5 (base station) shown in FIG. 9. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signaling between the (R)AN node 5 and other nodes, such as the UE 3 and the core network nodes. Such signaling includes appropriately formatted requests and responses relating to data analysis (e.g. detection of misbehaving UEs).

Core Network Node

Figure 12:
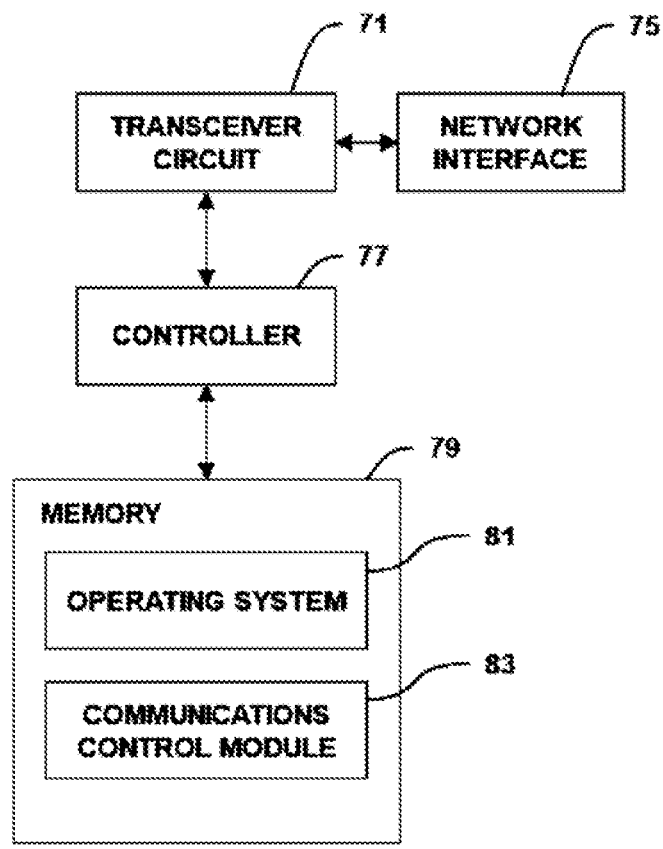
FIG. 12 is a block diagram illustrating the main components of a generic core network node.

FIG. 12 is a block diagram illustrating the main components of a generic core network node (or function) shown in FIG. 9, for example, the NWDAF 11, the AMF 12, and the SMF 13. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses relating to data analysis (e.g. detection of misbehaving UEs).

Modifications and Alternatives

Detailed example aspects have been described above. As those skilled in the art will appreciate, a number of modifications and alternatives can be made to the above example aspects whilst still benefiting from the disclosure embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the above example aspects, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example aspects, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above example aspects are also applicable to 'non-mobile' or generally stationary user equipment.

Various other modifications will be apparent to those skilled in the art and will not be described in further detail here.

LIST OF REFERENCES STATED IN THE PRESENT SPECIFICATION

[1] 3GPP TS 23.501 V16.2.0
[2] 3GPP TS 23.502 V16.2.0
[3] 3GPP TS 23.288 V16.1.0
[4] 3GPP TR 23.700-91 V0.2.0
[5] 3GPP TS 23.015 V15.1.0
[6] 3GPP TS 24.501 V16.2.0

This application is based upon and claims the benefit of priority from European Patent Application No. 19219407.4, filed on Dec. 23, 2019, the disclosure of which are incorporated herein in their entirety by reference.

REFERENCE SIGN LIST

1 MOBILE (CELLULAR OR WIRELESS) TELECOMMUNICATION SYSTEM
3 MOBILE DEVICE (UE)
5 BASE STATION
7 CORE NETWORK
11 NETWORK DATA ANALYTICS FUNCTION (NWDAF)
12 ACCESS AND MOBILITY MANAGEMENT FUNCTION (AMF)
13 SESSION MANAGEMENT FUNCTION (SMF)
20 external IP network
31 TRANSCEIVER CIRCUIT
33 ANTENNA
35 USER INTERFACE
37 CONTROLLER
39 MEMORY
41 OPERATING SYSTEM
43 COMMUNICATIONS CONTROL MODULE
51 TRANSCEIVER CIRCUIT
53 ANTENNA
55 NETWORK INTERFACE
57 CONTROLLER
59 MEMORY
61 OPERATING SYSTEM
63 COMMUNICATIONS CONTROL MODULE
71 TRANSCEIVER CIRCUIT
75 NETWORK INTERFACE
77 CONTROLLER
79 MEMORY
81 OPERATING SYSTEM
83 COMMUNICATIONS CONTROL MODULE

What is claimed is:

1. A Network Data Analytic Function, NWDAF, node, comprising:
    a memory storing instructions; and
    one or more processors configured to execute the instructions to:
        receive, from a first network function node in a core network, an equipment identifier of user equipment, UE, and a rejected cause in a case where the first network function node sends, to the UE, a reject message in response to a request from the UE;
        analyzing-analyse the equipment identifier and rejected cause to determine whether the UE is a misbehaving UE or not; and send to a second network function node in the core network node, the equipment identifier in a case where the UE is determined to the misbehaving UE.

2. The NWDAF node according to claim 1, wherein the one or more processors are configured to
analyze the equipment identifier and rejected cause to determine a pattern of the misbehaving UE, and
send, to the second network function node, the equipment identifier and the pattern of the misbehaving UE in a case where the UE is determined to the misbehaving UE.

3. The NWDAF node according to claim 1, wherein the one or more processors are configured to
receive, from the first network function node, a backoff timer which is disregarded by the UE, and
analyze, the equipment identifier, the rejected cause and the backoff timer to determine whether the UE is a misbehaving UE or not.

4. The NWDAF node according to claim 1, wherein the one or more processors are configured to
receive, from a plurality of first network function nodes in the core network, a respective equipment identifiers of UEs, and related rejected causes, and
analyze the equipment identifiers and the rejected causes to determine whether there is a misbehaving UE or there is a group of misbehaving UEs.

5. The NWDAF node according to claim 1, wherein the one or more processors are configured to
receive, from the first network function node, the equipment identifier of the UE, the rejected cause, and a cell identity which the UE is camping on in a case where the first network function node sends, to the UE, the reject message in response to the request from the UE, and
analyze a location distribution pattern of the misbehaving UE.

6. A controlling method for a Network Data Analytic Function, NWDAF, node, the controlling method comprising:
receiving, from a first network function node in a core network, an equipment identifier of user equipment, UE, and a rejected cause in a case where the first network function node sends, to the UE, a reject message in response to a request from the UE;
analyzing the equipment identifier and rejected cause to determine whether the UE is a misbehaving UE or not; and
sending, to a second network function node in the core network node, the equipment identifier in a case where the UE is determined to the misbehaving UE.

7. The controlling method according to claim 6, wherein
the analyzing includes analyzing the equipment identifier and rejected cause to determine a pattern of the misbehaving UE, and
the sending includes sending, to the second network function node, the equipment identifier and the pattern of the misbehaving UE in a case where the UE is determined to the misbehaving UE.

8. The controlling method according to claim 6, wherein
the receiving includes receiving, from the first network function node, a backoff timer which is disregarded by the UE, and
the analyzing includes analyzing, the equipment identifier, the rejected cause and the backoff timer to determine whether the UE is a misbehaving UE or not.

9. The controlling method according to claim 6, wherein
the receiving includes receiving, from a plurality of first network function nodes in the core network, a respective equipment identifiers of UEs, and related rejected causes,
the analyzing includes analyzing the equipment identifiers and the rejected causes to determine whether there is a misbehaving UE or there is a group of misbehaving UEs.

10. The controlling method according to claim 6 wherein
the receiving includes receiving, from the first network function node, the equipment identifier of the UE, the rejected cause, and a cell identity which the UE is camping on in a case where the first network function node sends, to the UE, the reject message in response to the request from the UE, and
the analyzing includes analyzing a location distribution pattern of the misbehaving UE.

11. The controlling method according to claim 6, wherein
the equipment identifier includes at least one of an International Mobile Equipment Identity Software Version and a Permanent Equipment Identifier.

12. The controlling method according to claim 6, wherein
the first network function node includes at least one of a core network node for mobility management and a core network node for session management.

13. The controlling method according to claim 6, wherein
the second network function node includes at least one of a core network node for a unified data management node, an equipment identity register, an operations, administration and maintenance system, an application function node and a core network node for policy control.

14. A controlling method for a second network function node in a core network, the controlling method comprising:
receiving, from a Network Data Analytic Function, NWDAF, node, an equipment identifier; and
taking action against user equipment, UE, indicated by the equipment identifier, wherein
the UE is determined by the NWDAF node, as a misbehaving UE by analyzing the equipment identifier and rejected cause which are sent from a first network function node in the core network to the NWDAF node and sent from the first network function node to the UE.

15. The controlling method according to claim 14, wherein
the receiving includes receiving, from the NWDAF node, the equipment identifier and pattern of the misbehaving UE, and
the taking action includes taking action against the UE based on the pattern of the misbehaving UE.

16. The controlling method according to claim 14, wherein
the receiving includes receiving, from the NWDAF node, the equipment identifier and a risk with a scale of the risk, and
the taking action includes taking action against the UE based on the risk with the scale of the risk.

17. The controlling method according to claim 14, wherein
the receiving includes receiving, from the NWDAF node, the equipment identifier and a recommendation for taking action, and
the taking action includes taking action against the UE based on the recommendation.

18. The controlling method according to claim 14, wherein
the equipment identifier includes at least one of an International Mobile Equipment Identity Software Version and a Permanent Equipment Identifier.

19. The controlling method according to claim 14, wherein
the first network function node includes at least one of a core network node for mobility management and a core network node for session management.

20. The controlling method according to claim 14, wherein
the second network function node includes at least one of a core network node for a unified data management node, an equipment identity register, an operations, administration and maintenance system, an application function node and a core network node for policy control.

* * * * *